United States Patent
Kido et al.

(10) Patent No.: US 12,423,095 B2
(45) Date of Patent: Sep. 23, 2025

(54) PROGRAM STRUCTURE ANALYZER AND METHOD FOR ANALYZING PROGRAM STRUCTURE

(71) Applicant: TOYOTA JIDOSHA KABUSHIKI KAISHA, Toyota (JP)

(72) Inventors: Kengo Kido, Ichikawa (JP); Nguyen Thuy Quynh Nhu, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 18/495,302

(22) Filed: Oct. 26, 2023

(65) Prior Publication Data
US 2024/0256273 A1 Aug. 1, 2024

(30) Foreign Application Priority Data
Jan. 31, 2023 (JP) .................. 2023-013080

(51) Int. Cl.
G06F 8/75 (2018.01)
(52) U.S. Cl.
CPC ..................... G06F 8/75 (2013.01)
(58) Field of Classification Search
CPC ....................................................... G06F 8/75
USPC .................. 717/120–123, 141–143
See application file for complete search history.

(56) References Cited

U.S. PATENT DOCUMENTS

| 6,691,301 | B2 * | 2/2004 | Bowen ..................... G06F 30/30 712/15 |
| 10,628,140 | B2 * | 4/2020 | Ueda ......................... G06F 8/41 |
| 11,675,571 | B1 * | 6/2023 | Makhija ................... G06F 8/35 717/104 |
| 2005/0289167 | A1 | 12/2005 | Haselden et al. |
| 2006/0143596 | A1 | 6/2006 | Miyashita et al. |

FOREIGN PATENT DOCUMENTS

| JP | 2006-12146 A | 1/2006 |
| JP | 2006-185211 A | 7/2006 |
| JP | 2013-235398 A | 11/2013 |

OTHER PUBLICATIONS

Patil et al., "PinPlay: A Framework for Deterministic Replay and Reproducible Analysis of Parallel Programs", 2010, ACM, pp. 2-11. (Year: 2010).*
Scott W. Ambler, "UML 2 Component Diagrams: An Agile Introduction", 2022, Ambysoft Inc., 7 pages. (Year: 2022).*

* cited by examiner

Primary Examiner — Ted T. Vo
(74) Attorney, Agent, or Firm — Sughrue Mion, PLLC (57) ABSTRACT

A program structure analyzer configured to analyze the structure of a program for causing a computer to execute a predetermined process identifies a source of an action corresponding to a starting pin associated with a reference port selected from one or more output ports set for a target block; repeats identification of a source with the identified source being set as the starting pin, until no output pin corresponding to an action executable by the target block is identified as a source; identifies an input port corresponding to an input pin receiving input from a source that is not an output pin corresponding to an action executable by the target block, as a parent port; and outputs, for each of the output ports set for the target block, dependence data indicating the parent port on which the output port depends.

4 Claims, 5 Drawing Sheets

| BLOCKS | ACTIONS |
|---|---|
| BL1 | AC11 |
| BL1 | AC12 |
| BL2 | AC21 |
| BL2 | AC22 |

| BLOCKS | PORTS | I/O |
|---|---|---|
| BL1 | PT11 | In |
| BL1 | PT12 | Out |
| BL2 | PT21 | In |
| BL2 | PT22 | In |
| BL2 | PT23 | Out |
| BL2 | PT24 | Out |

| ACTIONS | PINS | I/O | CONNECTION DESTINATIONS |
|---|---|---|---|
| AC11 | PN111 | In | DS1 |
| AC11 | PN112 | Out | PN121 |
| AC12 | PN121 | In | PN112 |
| AC12 | PN122 | Out | PN211 |
| AC21 | PN211 | In | PN122 |
| AC21 | PN212 | Out | DD1 |
| AC22 | PN221 | In | PN122 |
| AC22 | PN222 | In | DS2 |
| AC22 | PN223 | Out | DD2 |

| PINS | PORTS |
|---|---|
| PN111 | PT11 |
| PN122 | PT12 |
| PN211 | PT21 |
| PN221 | PT21 |
| PN222 | PT22 |
| PN212 | PT23 |
| PN223 | PT24 |

PROGRAM STRUCTURE ANALYZER AND METHOD FOR ANALYZING PROGRAM STRUCTURE

FIELD

The present disclosure relates to a program structure analyzer configured to analyze the structure of a program for causing a computer to execute a predetermined process.

BACKGROUND

In a program having a complex structure, such as a program including hierarchical blocks that are functional units constituting the program or a program including multiple blocks executed in parallel, a change to a block affects another block that uses output of the former block as input and that thereby depends on the former block. A program can be efficiently developed and changed by analyzing the structure of the program and grasping dependence between blocks.

Japanese Unexamined Patent Publication No. 2006-185211 (hereafter "Patent Literature 1") describes a program analyzing apparatus that generates a directed graph in which an edge is directed from a field of an object to a changed field. The program analyzing apparatus described in Patent Literature 1 obtains a history of changes made to fields of objects and information on the fields of objects that have caused these changes from the result of step-by-step execution of a program to be analyzed, and extracts a cause-effect relation between the objects. Based on the cause-effect relation between the objects, the program analyzing apparatus described in Patent Literature 1 generates a directed graph in which each field of each object is represented as a node and an edge is directed from a field that has caused a change to a changed field.

SUMMARY

In general, dependence between input and output is represented by a large number of requirement specifications that define actions of blocks from various aspects. Since a single requirement specification defines part of an action executed by a block, it is not easy to grasp dependence between input and output of each block as a whole in analysis of the structure of a program.

It is an object of the present disclosure to provide a program structure analyzer that can analyze dependence between input and output of each of blocks that are functional units constituting a program.

The following is a summary of the present disclosure.

(1) A program structure analyzer comprising a processor configured to:
  identify a source of an action corresponding to a starting pin by referring to a second correspondence, a third correspondence, and a fourth correspondence stored in a memory, wherein
    the action is among one or more actions executable in a target block among blocks constituting a program for causing a computer to execute a predetermined process,
    the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver,
    the source of one of the one or more actions is a data provider outside the target block or another one of the one or more actions,
    the second correspondence is a correspondence between the target block, one or more input ports corresponding to memory spaces for the target block to receive data from the data provider and the one or more output ports,
    the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and
    the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;
  repeat identification of the source with the identified source being set as the starting pin, by referring to the third correspondence and a first correspondence stored in the memory until none of the output pins corresponding to the one or more actions is identified as the source, wherein
    the first correspondence is a correspondence between the target block and the one or more actions;
  identify, out of the one or more input ports, an input port allocated an input pin receiving input from the source that is not an output pin corresponding to one of the one or more actions, as a parent port on which the reference port depends, by referring to the fourth correspondence; and
  output, for each of the one or more output ports set for the target block, dependence data indicating the parent port on which the output port depends.

(2) The program structure analyzer according to (1), wherein as the dependence data, the processor outputs a dependence chart in which each of the ports is represented as a node and dependence of one output port among the ports on a parent port on which the one output port depends is represented by an edge connecting the node corresponding to the one output port and the node corresponding to the parent port.

(3) A method for analyzing program structure executed by a program structure analyzer configured to analyze the structure of a program for causing a computer to execute a predetermined process, the method comprising:
  identifying a source of an action corresponding to a starting pin by referring to a second correspondence, a third correspondence, and a fourth correspondence stored in a memory, wherein
    the action is among one or more actions executable in a target block among blocks constituting the program, the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver, the source of one of the one or more actions is a data provider outside the target block or another one of the one or more actions, the second correspondence is a correspondence between the target block, one or more input ports corresponding to memory spaces for the target block to receive data from the data provider and the one or more output ports, the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;

repeating identification of the source with the identified source being set as the starting pin, by referring to the third correspondence and a first correspondence stored in the memory until none of the output pins corresponding to the one or more actions is identified as the source, wherein the first correspondence is a correspondence between the target block and the one or more actions;

identifying, out of the one or more input ports, an input port allocated an input pin receiving input from the source that is not an output pin corresponding to one of the one or more actions, as a parent port on which the reference port depends, by referring to the fourth correspondence; and outputting, for each of the one or more output ports set for the target block, dependence data indicating the parent port on which the output port depends.

(4) A non-transitory computer-readable medium storing a computer program for analyzing the structure of a program for causing a computer to execute a predetermined process, the computer program causing a computer to execute a process comprising:

identifying a source of an action corresponding to a starting pin by referring to a second correspondence, a third correspondence, and a fourth correspondence stored in a memory, wherein the action is among one or more actions executable in a target block among blocks constituting the program, the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver, the source of one of the one or more actions is the data provider outside the target block or another one of the one or more actions, the second correspondence is a correspondence between the target block, one or more input ports corresponding to memory spaces for the target block to receive data from the data provider and the one or more output ports, the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;

repeating identification of the source with the identified source being set as the starting pin, by referring to the third correspondence and a first correspondence stored in the memory until none of the output pins corresponding to the one or more actions is identified as the source, wherein the first correspondence is a correspondence between the target block and the one or more actions;

identifying, out of the one or more input ports, an input port allocated an input pin receiving input from the source that is not an output pin corresponding to one of the one or more actions, as a parent port on which the reference port depends, by referring to the fourth correspondence; and outputting, for each of the one or more output ports set for the target block, dependence data indicating the parent port on which the output port depends.

The program structure analyzer according to the present disclosure can analyze dependence between input and output of each of blocks that are functional units constituting a program.

DESCRIPTION OF EMBODIMENTS

A program structure analyzer will now be described in detail with reference to the attached drawings. The program structure analyzer analyzes the structure of a program for causing a computer to execute a predetermined process.

The program is composed of blocks each of which can execute one or more actions. Each of the blocks includes multiple ports; a port is set for each source and each destination outside the block to transfer data from the source and to the destination. In an executable program, ports correspond to predetermined areas in a memory space. Data used for each action is received from a source via an input pin. Data generated by each action is outputted to a destination via an output pin. In an executable program, pins correspond to predetermined areas in a memory space. To an input pin receiving input from a source outside a block or to an output pin for output to a destination outside a block is allocated part of a predetermined area in the memory space corresponding to a port. In the present disclosure, the structure of a program will be described using terms of SysML v1.3, but the program structure analyzer of the present disclosure is also applicable to a program whose structure is described in accordance with another modeling language (e.g., another version of SysML or UML).

Figure 1:
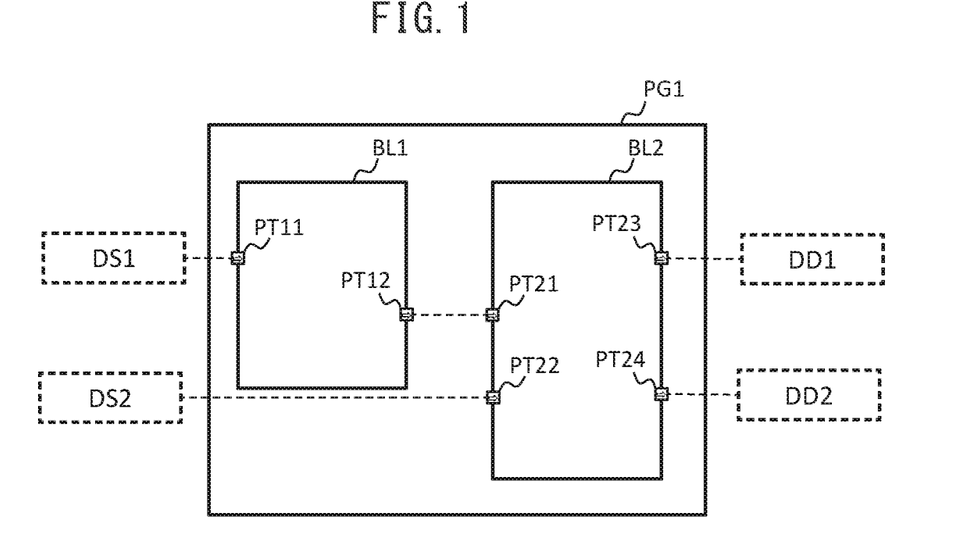
FIG. 1 is an example of an internal block diagram of a program.

FIG. 1 is an example of an internal block diagram of a program, and illustrates a connection relationship between components of the program.

The program PG1 illustrated in FIG. 1, which is an example of a program to be analyzed by the program structure analyzer of the present disclosure, is composed of blocks BL1 and BL2. The block BL1 receives input from a source DS1 via an input port PT11, executes actions AC11 and AC12, and outputs the result of execution to the block BL2 via an output port PT12. The block BL2 receives input from the block BL1 via an input port PT21 and from a source DS2 via an input port PT22. The block BL2 executes actions AC21 and AC22, and outputs the result of execution to a destination DD1 via an output port PT23 and to a destination DD2 via an output port PT24. In the present disclosure, input ports and output ports will also be referred to collectively as "ports."

An input port receives data from a data provider outside a block corresponding to the port. The sources DS1 and DS2 are examples of the data provider. An output port passes data to a data receiver outside a block corresponding to the port. The destinations DD1 and DD2 are examples of the data receiver.

The program PG1 is, for example, an acceleration calculation program to calculate the acceleration of a host vehicle in the front-back direction for automated driving of the vehicle, based on a vicinity image representing the surroundings of the vehicle and the speed of the vehicle. In such a program PG1, the block BL1 corresponds to a processing block to detect an object in the vicinity from a vicinity image. The source DS1 is, for example, a camera that generates vicinity images representing the surroundings of the vehicle. The block BL2 corresponds to a processing block to generate a trajectory of the vehicle. The source DS2 is, for example, a speed sensor that outputs speed information of the vehicle; the destination DD1 is, for example, a display that displays information on a vehicle ahead; and the destination DD2 is, for example, a travel mechanism that modifies the acceleration of the host vehicle according to a specified acceleration.

Figure 2:
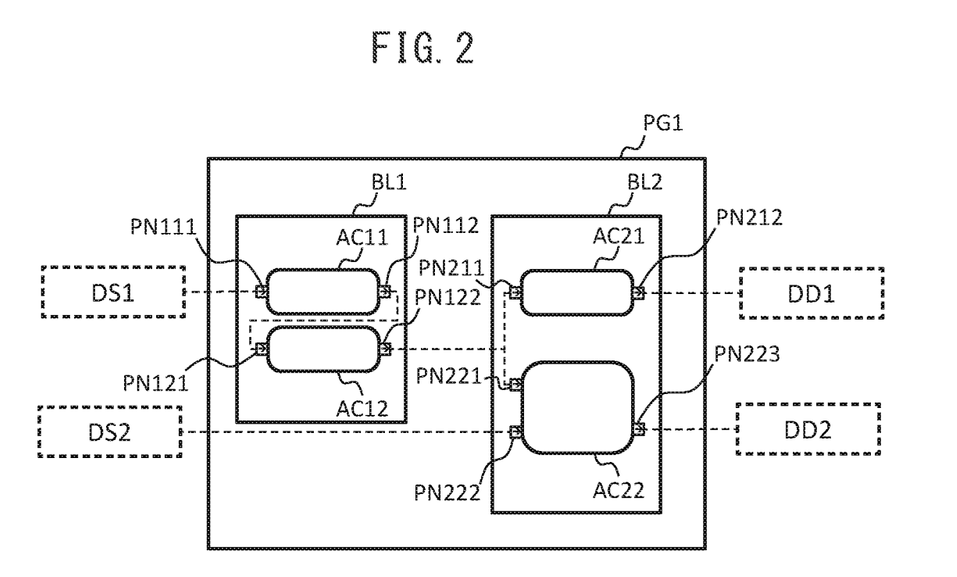
FIG. 2 is an example of an activity diagram of the program.

FIG. 2 is an example of an activity diagram of the program PG1, and illustrates flow of data and control in the actions executed in the blocks constituting the program PG1.

The block BL1 can execute the actions AC11 and AC12. In the action AC11, the block BL1 receives data from an input pin PN111 and outputs data from an output pin PN112. In the action AC12, the block BL1 receives data from an input pin PN121 and outputs data from an output pin PN122. In the present disclosure, input pins and output pins will also be referred to collectively as "pins."

In the example of the program PG1, which is an acceleration calculation program, the block BL1 executes the action AC11 to process a vicinity image received from the source DS1 (camera) via the input pin PN111, and outputs the result of execution via the output pin PN112. The block BL1 also executes the action AC12 to calculate the position and speed of a vehicle ahead, based on the result of processing on a vicinity image received from the output pin PN112 via the input pin PN121, and outputs the result of calculation via the output pin PN122.

The block BL2 can execute the actions AC21 and AC22. In the action AC21, the block BL2 receives data from an input pin PN211 and outputs data from an output pin PN212. In the action AC22, the block BL2 receives data from input pins PN221 and PN222 and outputs data from an output pin PN223.

An input pin receives data from a data providing unit or one of one or more actions in a block corresponding to the input pin. An output pin passes data to a data receiving unit or one of one or more actions in a block corresponding to the output pin.

In the example of the program PG1, which is an acceleration calculation program, the block BL2 executes the action AC21 to generate display information on the vehicle ahead, based on the position and speed of the vehicle ahead received from the output pin PN122 via the input pin PN211. The block BL2 outputs the display information to the destination DD1 (display) via the output pin PN212. The block BL2 also executes the action AC22 to calculate a target acceleration in the front-back direction, based on the position and speed of the vehicle ahead received from the output pin PN122 via the input pin PN221 and speed information received from the source DS2 (speed sensor) via the input pin PN222. The block BL2 outputs the result of calculation to the destination DD2 (travel mechanism) via the output pin PN223.

In developing the program PG1, each action executable by a constituent block is defined by a requirement. In a complex program, it is not realistic to represent all actions in a single activity diagram, because a large number, e.g., thousands to tens of thousands, of requirements are defined in each block.

To grasp an area affected by a change to part of the program PG1 appropriately, it is necessary to find out dependence between ports in each block represented in the internal block diagram. In the example of FIG. 2, it can be understood that if a change to the block BL1 causes a change to the specification of output data outputted from the output port PT12, the block BL2 including the input port PT21 that receives data from the output port PT12 will be affected. However, to determine whether the destination DD2 will also be affected in this case, it is necessary to clarify dependence of the output port PT24, which outputs data to the destination DD2, on the input port PT21, which receives data.

Figure 3:
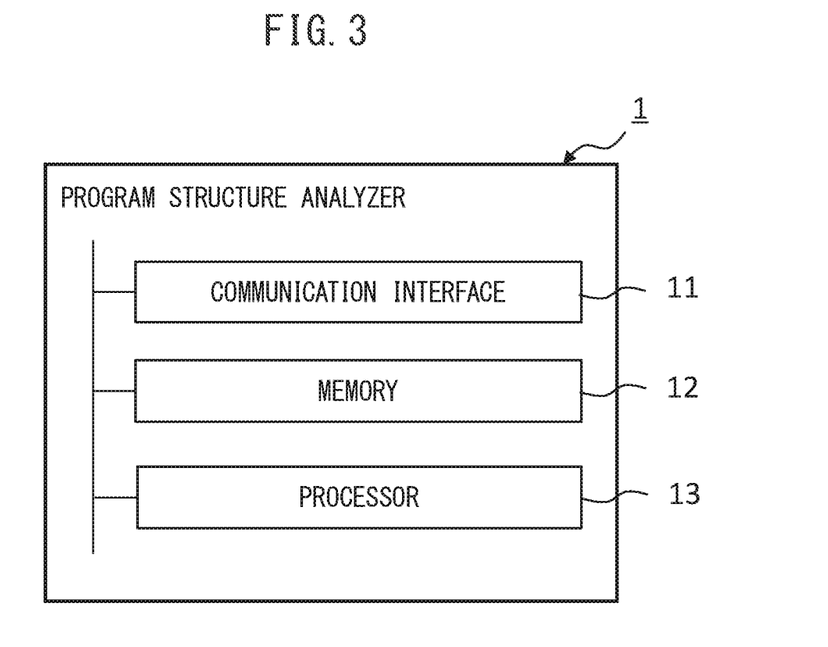
FIG. 3 illustrates the hardware configuration of a program structure analyzer.

FIG. 3 illustrates the hardware configuration of a program structure analyzer 1. The program structure analyzer 1 is a computer including a communication interface 11, a memory 12, and a processor 13.

The communication interface 11, which is an example of a communication unit, includes a communication interface circuit for communicably connecting the program structure analyzer 1 to an external device. The communication interface 11 provides received data for the processor 13, and outputs data provided from the processor 13 to an external device. The communication interface 11 executes communication conforming to, for example, IEEE802.3.

The memory 12, which is an example of the storage unit, includes volatile and nonvolatile semiconductor memories. The memory 12 stores various types of data used for processing by the processor 13, e.g., allocation information representing correspondences between elements constituting the program. The memory 12 also stores various application programs, e.g., a computer program for analyzing program structure to execute a program structure analyzing process. As a storage unit, the program structure analyzer 1 may include a storage device communicably connected via the communication interface 11. The storage device includes a communication interface, a memory, and a processor that executes a reading process by which data read from the memory in response to a reading instruction received from the program structure analyzer 1 via the communication interface is transmitted to the program structure analyzer 1.

Figure 4A:
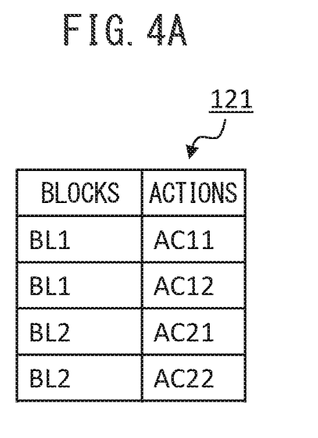
FIG. 4A illustrates a correspondence between blocks and actions.
Figure 4B:
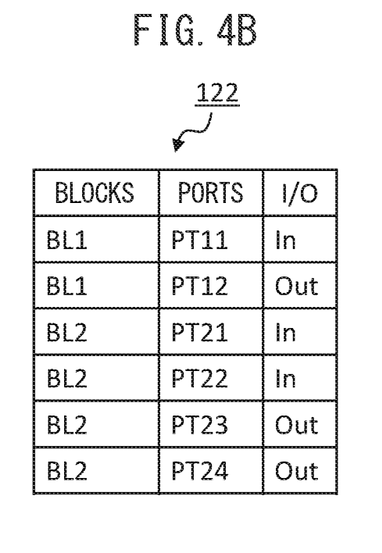
FIG. 4B illustrates a correspondence between blocks and ports.
Figure 4C:
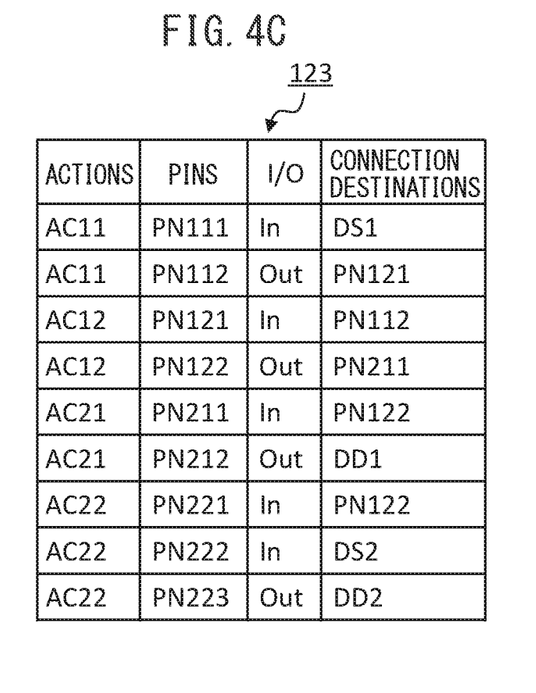
FIG. 4C illustrates a correspondence between actions, pins, and connection destinations.
Figure 4D:
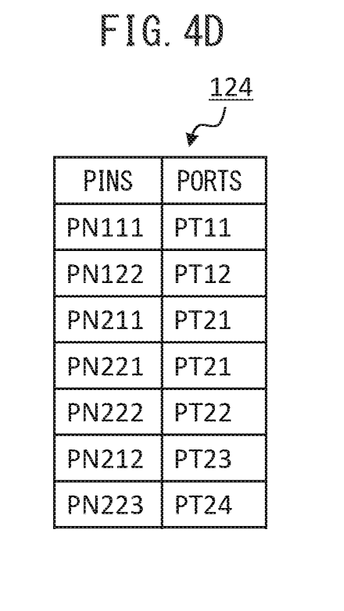
FIG. 4D illustrates a correspondence between pins and ports.

FIGS. 4A to 4D illustrate an example of the allocation information stored in the memory 12 that represents correspondences between elements constituting the program PG1. FIG. 4A illustrates a correspondence between blocks and actions; FIG. 4B illustrates a correspondence between blocks and ports; FIG. 4C illustrates a correspondence between actions, pins, and connection destinations; and FIG. 4D illustrates a correspondence between pins and ports.

FIG. 4A illustrates a block-action correspondence 121 between each of the blocks constituting the program PG1 and actions executed in the block. The block-action correspondence 121 is an example of the first correspondence, and indicates, for example, that the action AC11 is executable by the block BL1.

The block-action correspondence 121 is set by a designer of the program PG1, depending on requirements that define actions executable by each of the blocks constituting the program PG1. The block-action correspondence 121 is used for making the activity diagram illustrated in FIG. 2.

FIG. 4B illustrates a block-port correspondence 122 between each of the blocks constituting the program PG1, ports corresponding to the block, and classifications indicating whether the ports are for input or output of the block. The block-port correspondence 122 is an example of the second correspondence, and indicates, for example, that the port PT11 is an input port used for input into the block BL1.

The block-port correspondence 122 is set by a designer of the program PG1 when the ports to the blocks constituting the program PG1 are made.

FIG. 4C illustrates an action-pin correspondence 123 between each of the one or more actions executable by each of the blocks constituting the program PG1, pins corresponding to the action, classifications indicating whether the pins are for input or output of the action, and their connection destinations. The action-pin correspondence 123 is an example of the third correspondence, and indicates, for example, that the pin PN111 is an input pin used for input into the action AC11 and is connected to the source DS1.

The action-pin correspondence 123 is set by a designer of the program PG1, depending on requirements that define actions executable by each of the blocks constituting the program PG1. The action-pin correspondence 123 is used for making the activity diagram illustrated in FIG. 2.

FIG. 4D illustrates a pin-port correspondence 124 between a pin allocated to a port among the pins corresponding to the one or more actions executable by each of the blocks constituting the program PG1 and the port allocated the pin. The ports allocated pins in the pin-port correspondence 124 include input ports and output ports. A pin allocated to an input port corresponds to an input pin whereas a pin allocated to an output port corresponds to an output pin. Thus the pin-port correspondence 124 includes a correspondence between input pins and input ports as well as a correspondence between output pins and output ports. The pin-port correspondence 124 is an example of the fourth correspondence, and indicates, for example, that the pin PN111 among the pins set for the action AC11 among the actions executable by the block BL1 corresponds to the port PT11 included in the block BL1.

The pin-port correspondence 124 is set by a developer of the program PG1 at the stage of development of the program PG1. The ports and pins may be named at the stage of development of the program PG1, depending on the content of data to be exchanged using these ports and pins, and the program structure analyzer 1 may associate the ports with the pins, based on their names. For example, the input port PT11 through which the block BL1 receives input from the source DS1 (camera) may be named "ImageDataPort," and the input pin PN111 through which the action AC11 receives a vicinity image may be named "ImageData." By setting the names of the port and the pin in this way, the program structure analyzer 1 can make the pin-port correspondence 124, in which the input port PT11 is associated with the input pin PN111, based on the degree of matching of character strings included in their names, and store the correspondence in the memory 12.

The memory 12 may store another correspondence different from those described above.

Referring back to FIG. 3, the processor 13, which is an example of a control unit, includes one or more processors and a peripheral circuit thereof. The processor 13 may further include another operating circuit, such as a logic-arithmetic unit, an arithmetic unit, or a graphics processing unit.

Figure 5:
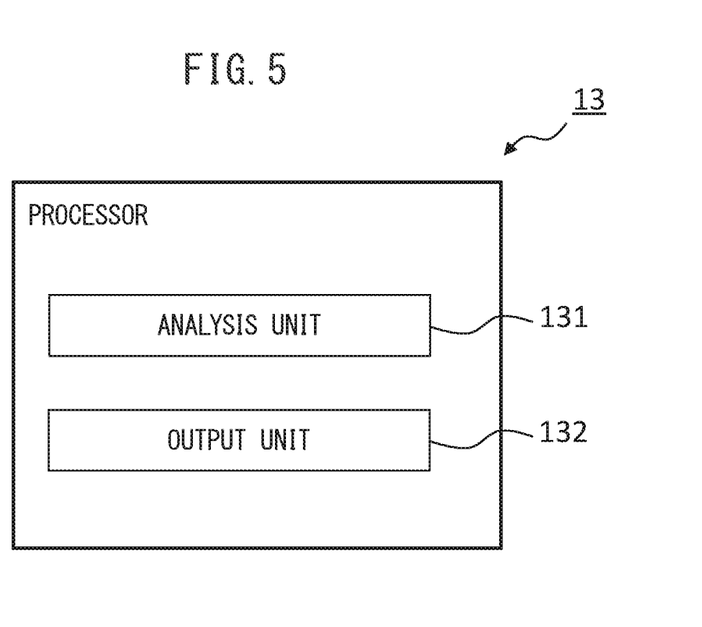
FIG. 5 is a functional block diagram of a processor included in the program structure analyzer.

FIG. 5 is a functional block diagram of the processor 13 included in the program structure analyzer 1.

As its functional blocks, the processor 13 of the program structure analyzer 1 includes an analysis unit 131 and an output unit 132. These units included in the processor 13 are functional modules implemented by a computer program executed by the processor 13. The computer program for achieving the functions of the units of the processor 13 may be provided in a form recorded on a computer-readable portable storage medium, such as a semiconductor memory, a magnetic medium, or an optical medium. Alternatively, the units included in the processor 13 may be implemented in the program structure analyzer 1 as separate integrated circuits, microprocessors, or firmware.

The analysis unit 131 selects an output port as a reference port from one or more output ports set for a target block among the blocks constituting the program PG1, by referring to the block-port correspondence 122 stored in the memory 12. The target block is a block to be analyzed by the program structure analyzer 1. The target block may be designated by a user of the program structure analyzer 1, selected from the blocks in a predetermined order (e.g., in ascending order of numerals assigned to the blocks), or selected randomly. The analysis unit 131 selects a reference port from one or more output ports for output among the ports corresponding to the target block. When multiple output ports are set for the target block, the analysis unit 131 selects from the output ports set for the target block in a predetermined order (e.g., in ascending order of numerals assigned to the output ports). Alternatively, the analysis unit 131 may select a reference port randomly from the output ports set for the target block.

The analysis unit 131 selects an output pin allocated to the reference port as a starting pin, by referring to the pin-port correspondence 124 stored in the memory 12. When multiple output pins are selected, the analysis unit 131 selects a starting pin from the selected output pins in a predetermined order (e.g., in ascending order of numerals assigned to the output pins). Alternatively, the analysis unit 131 may select a starting pin randomly from the selected output pins.

The analysis unit 131 identifies an action corresponding to the starting pin by referring to the action-pin correspondence 123 stored in the memory 12. The analysis unit 131 identifies an input pin set for the action associated with the starting pin, by referring to the action-pin correspondence 123. The analysis unit 131 then identifies a connection destination of the identified input pin as the source of the action associated with the starting pin, by referring to the action-pin correspondence 123.

The analysis unit 131 repeats identification of a source with the identified source being set as the starting pin until none of the output pins corresponding to the one or more actions executable by the target block is identified as a source. When multiple input pins are set for the action associated with the starting pin, the analysis unit 131 identifies the source for each input pin. The analysis unit 131 identifies a block executing the action associated with the starting pin, by referring to the block-action correspondence 121 stored in the memory 12. The analysis unit 131 can determine whether the identified block is the same as the target block to determine whether the source is outside the target block. When the source is inside the target block, the source is an output pin of an action executable by the target block.

The analysis unit 131 identifies an input port allocated an input pin receiving input from a source that is not an output pin corresponding to one of the one or more actions in the target block, by referring to the pin-port correspondence 124 stored in the memory 12. The analysis unit 131 stores the identified input port in the memory 12 as a parent port on which the reference port depends.

The analysis unit 131 selects a port that has not been selected as a reference port as a new reference port from the one or more output ports set for the target block, and repeats the above processing.

The output unit 132 outputs dependence data indicating the parent ports on which the one or more output ports set for the target block depend, by referring to the relationship between the one or more output ports and the parent ports stored in the memory 12.

Figure 6:
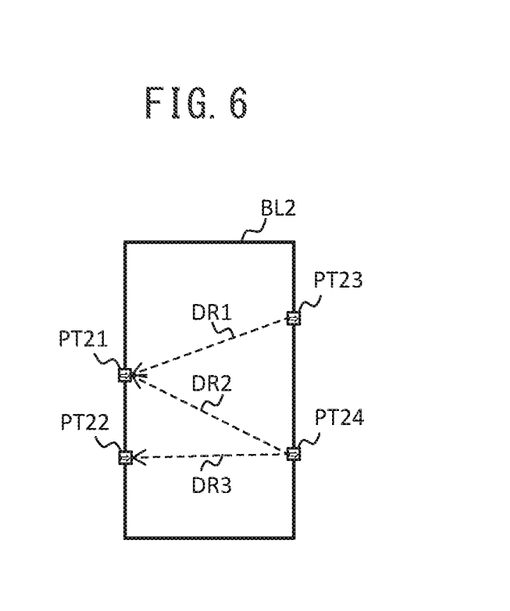
FIG. 6 illustrates an example of a dependence chart.

FIG. 6 illustrates an example of the dependence data. FIG. 6 is a dependence chart illustrating, with an image, dependence between the output ports PT23 and PT24 and parent ports on which the output ports depend for the case where the block BL2 is a target block.

The dependence chart is, for example, an image in which each of the ports is represented as a node and dependence of an output port on a parent port is represented by an edge connecting a node corresponding to the output port and a node corresponding to the parent port.

In the example of FIG. 6, dependence DR1 indicates that the output port PT23 depends on the input port PT21. Dependence DR2 indicates that the output port PT24 depends on the input port PT21. Dependence DR3 indicates that the output port PT24 depends on the input port PT22.

The output unit 132 may output a dependence list that represents dependence of an output port on an input port by text data as the dependence data.

Figure 7:
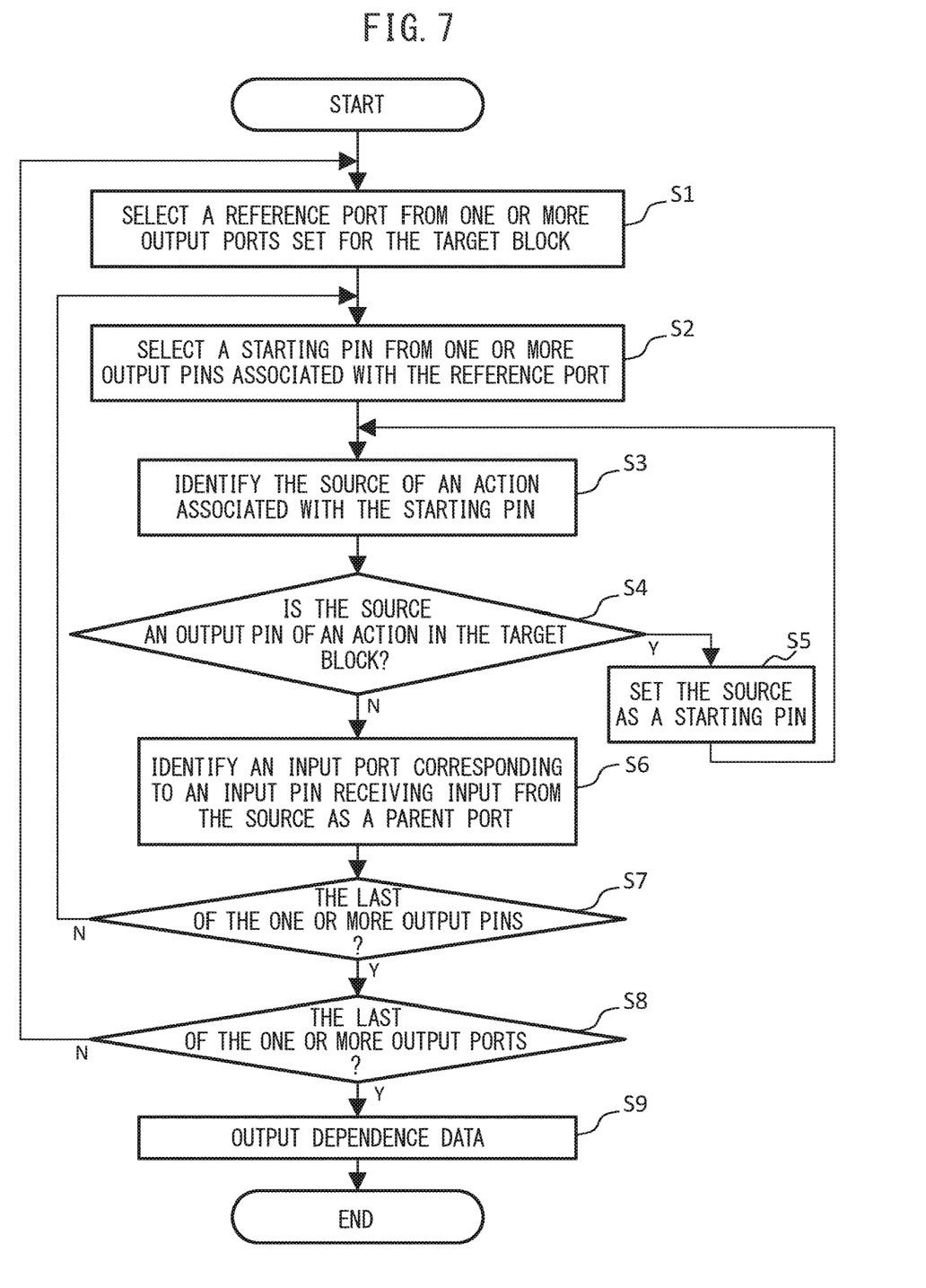
FIG. 7 is a flowchart of a program structure analyzing process.

FIG. 7 is a flowchart of a program structure analyzing process. The processor 13 of the program structure analyzer 1 executes the program structure analyzing process described below in response to a user's program analysis instruction involving designation of a target block to be analyzed among the blocks constituting the program PG1.

First, the analysis unit 131 of the processor 13 of the program structure analyzer 1 selects a reference port from one or more output ports set for the target block (step S1). The analysis unit 131 also selects a starting pin from one or more output pins associated with the reference port (step S2). The analysis unit 131 then identifies the source of an action associated with the starting pin (step S3).

The analysis unit 131 determines whether the source of the action associated with the starting pin is an output pin corresponding to one of the one or more actions in the target block (step S4). When the source of the action associated with the starting pin is an output pin corresponding to one of the one or more actions in the target block (Yes in step S4), the analysis unit 131 sets the output pin that is the source as a new starting pin (step S5) and repeats the processing of step S3 and the subsequent steps.

When the source of the action associated with the starting pin is not an output pin corresponding to one of the one or more actions in the target block (No in step S4), the analysis unit 131 identifies an input port corresponding to an input pin receiving input from the source as a parent port (step S6).

The analysis unit 131 determines whether the output pin selected in step S2 as a starting pin in execution of the processing up to step S6 is the last of the one or more output pins corresponding to the reference port (step S7). When the output pin is not the last (No in step S7), the process returns to step S2, and the analysis unit 131 selects a starting pin from output pins that have not been selected as a starting pin in the previous processing of step S2 among the one or more output pins corresponding to the reference port.

When the output pin selected as the starting pin is the last (Yes in step S7), the analysis unit 131 determines whether the output port selected in step S1 as a reference port in execution of the processing up to step S7 is the last of the one or more output ports set for the target block (step S8). When the output port is not the last (No in step S8), the process returns to step S1, and the analysis unit 131 selects a reference port from output ports that have not been selected as a reference port in the previous processing of step S1 among the one or more output ports set for the target block.

When the output port selected as the reference port is the last (Yes in step S8), the output unit 132 outputs dependence data indicating the parent ports on which the one or more output ports set for the target block depend (step S9) and terminates the program structure analyzing process.

By executing the program structure analyzing process in this way, the program structure analyzer 1 can analyze dependence between input and output of each of blocks that are functional units constituting a program.

Note that those skilled in the art can make various changes, substitutions, and modifications without departing from the spirit and scope of the present disclosure.

What is claimed is:

1. A program structure analyzer comprising a processor configured to:
   identify a source of an action corresponding to a starting pin by referring to a second correspondence, a third correspondence, and a fourth correspondence stored in a memory, wherein
      the action is among one or more actions executable in a target block among blocks constituting a program for causing a computer to execute a predetermined process,
      the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver,
      the source of one of the one or more actions is a data provider outside the target block or another one of the one or more actions,
      the second correspondence is a correspondence between the target block, one or more input ports corresponding to memory spaces for the target block to receive data from the data provider and the one or more output ports,
      the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and
      the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;
   repeat identification of the source with the identified source being set as the starting pin, by referring to the third correspondence and a first correspondence stored in the memory until none of the output pins corresponding to the one or more actions is identified as the source, wherein
      the first correspondence is a correspondence between the target block and the one or more actions;
   identify, out of the one or more input ports, an input port allocated an input pin receiving input from the source that is not an output pin corresponding to one of the one or more actions, as a parent port on which the reference port depends, by referring to the fourth correspondence; and
   output, for each of the one or more output ports set for the target block, dependence data indicating the parent port on which the output port depends.

2. The program structure analyzer according to claim 1, wherein as the dependence data, the processor outputs a dependence chart in which each of the ports is represented as a node and dependence of one output port among the ports on a parent port on which the one output port depends is represented by an edge connecting the node corresponding to the one output port and the node corresponding to the parent port.

3. A method for analyzing program structure executed by a program structure analyzer configured to analyze the structure of a program for causing a computer to execute a predetermined process, the method comprising:
   identifying a source of an action corresponding to a starting pin by referring to a second correspondence, a third correspondence, and a fourth correspondence stored in a memory, wherein
      the action is among one or more actions executable in a target block among blocks constituting the program,
      the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver,
      the source of one of the one or more actions is a data provider outside the target block or another one of the one or more actions,
      the second correspondence is a correspondence between the target block, one or more input ports corresponding to memory spaces for the target block to receive data from the data provider and the one or more output ports,
      the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and
      the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;
   repeating identification of the source with the identified source being set as the starting pin, by referring to the third correspondence and a first correspondence stored in the memory until none of the output pins corresponding to the one or more actions is identified as the source, wherein
      the first correspondence is a correspondence between the target block and the one or more actions;
   identifying, out of the one or more input ports, an input port allocated an input pin receiving input from the source that is not an output pin corresponding to one of the one or more actions, as a parent port on which the reference port depends, by referring to the fourth correspondence; and outputting, for each of the one or more output ports set for the target block, dependence data indicating the parent port on which the output port depends.

4. A non-transitory computer-readable medium storing a computer program for analyzing the structure of a program for causing a computer to execute a predetermined process, the computer program causing a computer to execute a process comprising:
- identifying a source of an action corresponding to a starting pin by referring to a second correspondence, a third correspondence, and a fourth correspondence stored in a memory, wherein
  - the action is among one or more actions executable in a target block among blocks constituting the program,
  - the starting pin is among one or more output pins respectively corresponding to memory spaces for passing data generated by one of the one or more actions to a destination, which is a data receiver outside the target block or another one of the one or more actions, allocated to a reference port selected from one or more output ports corresponding to memory spaces for passing data to the data receiver,
  - the source of one of the one or more actions is the data provider outside the target block or another one of the one or more actions,
  - the second correspondence is a correspondence between the target block, one or more input ports corresponding to memory spaces for the target block to receive data from the data provider and the one or more output ports,
  - the third correspondence includes, for each of the one or more actions, a correspondence between the action, an input pin corresponding to a memory space for receiving data used for the action from the source, and the source, and a correspondence between the action, an output pin corresponding to a memory space for passing data generated by the action to the destination, and the destination, and
  - the fourth correspondence includes a correspondence between an input pin allocated to one of the one or more input ports among the input pins respectively corresponding to the one or more actions and an input port allocated the input pin, and a correspondence between an output pin allocated to one of the one or more output ports among the output pins respectively corresponding to the one or more actions and an output port allocated the output pin;
- repeating identification of the source with the identified source being set as the starting pin, by referring to the third correspondence and a first correspondence stored in the memory until none of the output pins corresponding to the one or more actions is identified as the source, wherein
  - the first correspondence is a correspondence between the target block and the one or more actions;
- identifying, out of the one or more input ports, an input port allocated an input pin receiving input from the source that is not an output pin corresponding to one of the one or more actions, as a parent port on which the reference port depends, by referring to the fourth correspondence; and
- outputting, for each of the one or more output ports set for the target block, dependence data indicating the parent port on which the output port depends.

* * * * *